United States Patent
Nine et al.

(10) Patent No.: US 12,552,322 B2
(45) Date of Patent: Feb. 17, 2026

(54) ENTRY STEPS WITH CENTER STRINGER

(71) Applicant: Lippert Components, Inc., Elkhart, IN (US)

(72) Inventors: Tyler Nine, Osceola, IN (US); Brandon Joseph Williams, Warsaw, IN (US); Nicholas Cornett, Granger, IN (US); Bryan J. Roth, Topeka, IN (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 553 days.

(21) Appl. No.: 18/081,282

(22) Filed: Dec. 14, 2022

(65) Prior Publication Data

US 2023/0182642 A1    Jun. 15, 2023

Related U.S. Application Data

(60) Provisional application No. 63/289,185, filed on Dec. 14, 2021.

(51) Int. Cl.
 *B60R 3/02* (2006.01)
(52) U.S. Cl.
 CPC ...................... *B60R 3/02* (2013.01)
(58) Field of Classification Search
 CPC ........................................................ B60R 3/02
 See application file for complete search history.

(56) References Cited

U.S. PATENT DOCUMENTS

| | | | |
|---|---|---|---|
| 3,033,309 A | 5/1962 | Fugere | |
| D315,134 S | 3/1991 | Springer | |
| 6,354,403 B1 | 3/2002 | Truckner et al. | |
| 7,144,058 B1 | 12/2006 | Winter | |
| 8,261,880 B1 | 9/2012 | Hop | |
| 9,539,948 B1 * | 1/2017 | Presley | B60R 3/02 |
| 9,903,121 B2 | 2/2018 | Tompkins et al. | |
| 2002/0088669 A1 | 7/2002 | Truckner et al. | |
| 2007/0273123 A1 | 11/2007 | Wilson | |
| 2012/0285028 A1 | 11/2012 | Atwood | |
| 2016/0369514 A1 | 12/2016 | Grommet | |
| 2017/0267181 A1 | 9/2017 | Hoffman et al. | |
| 2017/0350134 A1 | 12/2017 | Tompkins et al. | |
| 2018/0148936 A1 | 5/2018 | Tompkins et al. | |
| 2020/0102788 A1 | 4/2020 | Byers et al. | |
| 2021/0261060 A1 | 8/2021 | Schwarz | |
| 2021/0261061 A1 | 8/2021 | Fuller et al. | |
| 2023/0053207 A1 | 2/2023 | Roth | |

OTHER PUBLICATIONS

International Search Report dated Apr. 28, 2023 issued in PCT International Patent Application No. PCT/US2022/052878, 4 pp.

* cited by examiner

*Primary Examiner* — Bryan A Evans
(74) *Attorney, Agent, or Firm* — NIXON & VANDERHYE P.C.

(57) ABSTRACT

A stair assembly suited for a vehicle entrance includes a plurality of step treads, each of the step treads having a tread width, and a stringer to which the plurality of step treads are secured. The stringer is positioned within the tread width.

26 Claims, 19 Drawing Sheets

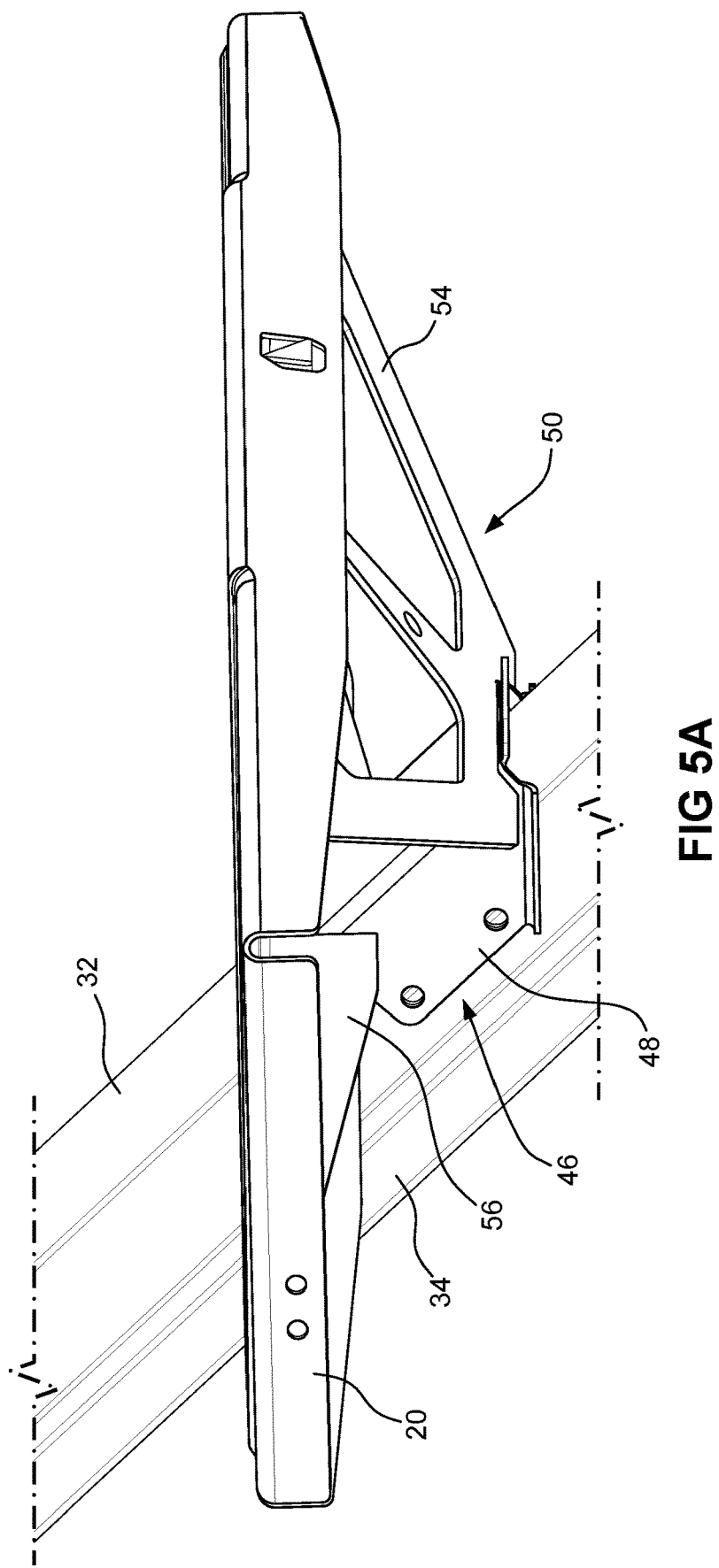

ENTRY STEPS WITH CENTER STRINGER

CROSS-REFERENCES TO RELATED APPLICATIONS

This application claims the benefit of U.S. Provisional Patent Application No. 63/289,185, filed Dec. 14, 2021, the entire content of which is herein incorporated by reference.

STATEMENT REGARDING FEDERALLY SPONSORED RESEARCH OR DEVELOPMENT (NOT APPLICABLE)

BACKGROUND

The invention relates to a stowable stair assembly for use in connection with an entry door and doorway of a mobile structure or other structure and, more particularly, to a stowable stair assembly utilizing a center stringer supporting the step treads.

Existing step assemblies typically include outer stringers with step treads connected between the stringers. These assemblies can be bulky in appearance and difficult to maneuver between stowed and use positions. The presence of stringers on either side of the step treads may also cause a tripping hazard and limit the user to entry directly in front of the bottom step treads.

SUMMARY

The stair assembly of the described embodiments includes a plurality of step treads and a stringer to which the step treads are secured, where the stringer is positioned within a tread width of the step treads. In some embodiments, the stringer is a single stringer centrally positioned within the tread width. The assembly is secured to the vehicle threshold via a threshold plate that enables the assembly to be pivoted between the stowed and use positions.

In some embodiments, the stringer is constructed of an aluminum extrusion, either with two parts connected together or a single integrated part. The stringer combines features both for support of the step treads and housing of a drop leg for a stabilizing footpad. A top portion of the extrusion mounts individual step treads via a tread mounting bracket. A top of the extrusion may be shaped to assist in mounting the threshold plate by using bolts to simultaneously secure the top tread and an adapter piece that is welded to the threshold plate.

The treads are generally constructed of a flat top with bent edges to create a downward flange on the front, back and sides of each tread. The flat top of each tread also has a slight upward curve when viewed from a top perspective. That is, each tread may be curved slightly around the stringer. Each tread may be provided with a support structure connecting the tread frame to the mounting bracket. In an exemplary construction, the support structure includes an angular frame from a side profile that supports the bottom surface of the flat top of the tread and then supports the front edge of the tread with an angled plate that connects to the front of the mounting bracket. A short rear flange of the support structure is parallel and adjacent the rear flange of the step tread, the rear flange of the support structure being secured to the back of the mounting bracket. The front angled plate and the rear flange of the support structure may be triangular in shape.

In an exemplary embodiment, a stair assembly includes a plurality of step treads, each of the step treads having a tread width, and a stringer to which the plurality of step treads are secured, where the stringer is positioned within the tread width.

The stringer may be centrally positioned within the tread width. The stringer may be a single stringer and may be sole support for the step treads.

The stair assembly may include a threshold plate secured to the stringer and selectively attachable to an entry threshold. The threshold plate may include a hinge such that the stair assembly is pivotable between a stowed position and a use position. The threshold plate may include a connecting section attachable to the entry threshold and a support plate connected to the stringer, where the stair assembly further includes a latching assembly configured to be secured the stair assembly in the stowed position. The latching assembly may have a propping plate connected at one end to the connecting section and selectively connectable at an opposite end to a vertical support component coupled with the support plate. The latching assembly may further include at least one connecting cable connected between the connecting section and the support plate. The propping plate may be pivotable between a connected position engaging the support plate and a disconnected position disengaged from the support plate, where in the disconnected position, the propping plate lays flat against the connecting section. The propping plate may be biased toward the disconnected position by a spring.

The stair assembly may also include an adapter fixed to the threshold plate and securable to the stringer. A top step tread of the plurality of step treads may be secured to the stringer via bolts, where the adapter is secured to the stringer with the bolts.

The stair assembly may also include a plurality of tread mounting brackets respectively connected between the step treads and the stringer. The stringer may include a bracket connect section and a leg section, where the bracket connect section has an outer shape, and where the tread mounting brackets include flanges that are shaped in complement to the outer shape. The flanges of the tread mounting brackets may be secured to the stringer via bolts. Each of the tread mounting brackets may include a support structure connected to the tread mounting brackets, wherein the support structure includes a triangular frame from a side profile with a first leg that extends across a bottom surface of the step treads, a second leg as an angled plate that extends from a front of the step treads and may be connected to the tread mounting brackets, and a third leg fixed to the tread mounting brackets.

The step treads may have a flat top with bent edges to create downward flanges on a front, a back, and sides of each of the step treads. The step treads may be curved around the stringer.

The stringer may include a bracket connect section and a leg section, where the stair assembly may further include a support leg selectively positionable in the leg section. A stabilizing footpad may be secured at a distal end of the support leg.

The stringer may include a bracket connect section and a leg section, and the stair assembly may include an electrical wire extending through one of the bracket connect section and the leg section. The bracket connect section may include a first extruded hollow tube and the leg section may include a second extruded hollow tube, where the bracket connect section is fixed to the leg section. The bracket connect section and the leg section may be integrated as a one-piece extrusion.

In another exemplary embodiment, a stair assembly for a vehicle entrance includes a plurality of step treads, each of the step treads having a tread width, a stringer to which the plurality of step treads are secured, where the stringer is positioned within the tread width, and a threshold plate secured to the stringer and selectively attachable to the vehicle entrance. The threshold plate includes a hinge such that the stair assembly is pivotable between a stowed position and a use position.

BRIEF DESCRIPTION OF THE DRAWINGS

These and other aspects and advantages will be described in detail with reference to the accompanying drawings, in which:

FIGS. 5A-5D and 6 show support structure for the step treads;

DETAILED DESCRIPTION

Figure 1:
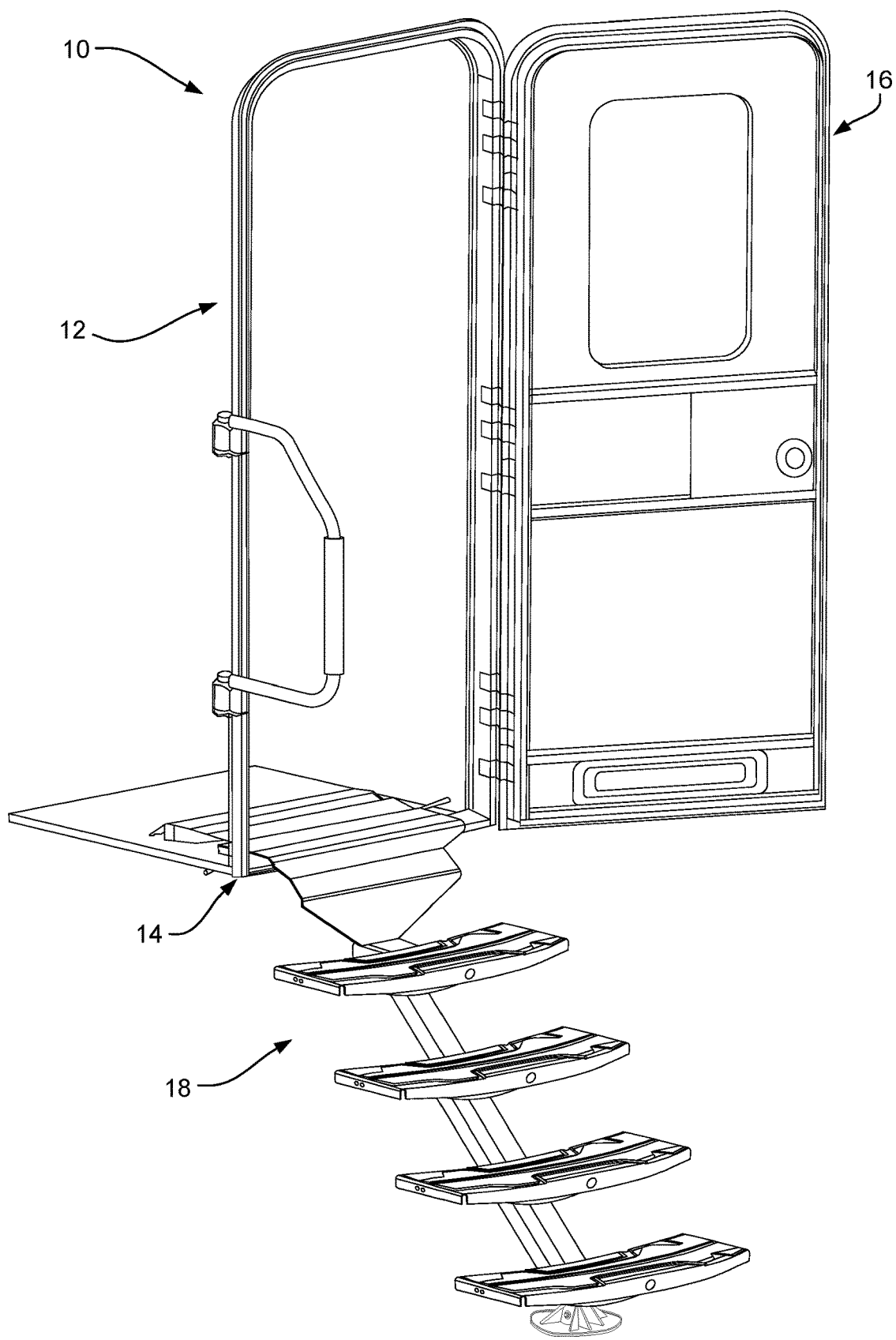
FIG. 1 shows the stair assembly in a vehicle entryway pivoted to a use position.

FIG. 1 shows an exemplary vehicle entrance 10 of a recreational vehicle or the like including a door frame 12 with a threshold 14 and a door 16. A stair assembly 18 is secured in the vehicle entrance and is pivotable between a use position (shown in FIG. 1) and a stowed position (shown in FIG. 11).

Figure 2:
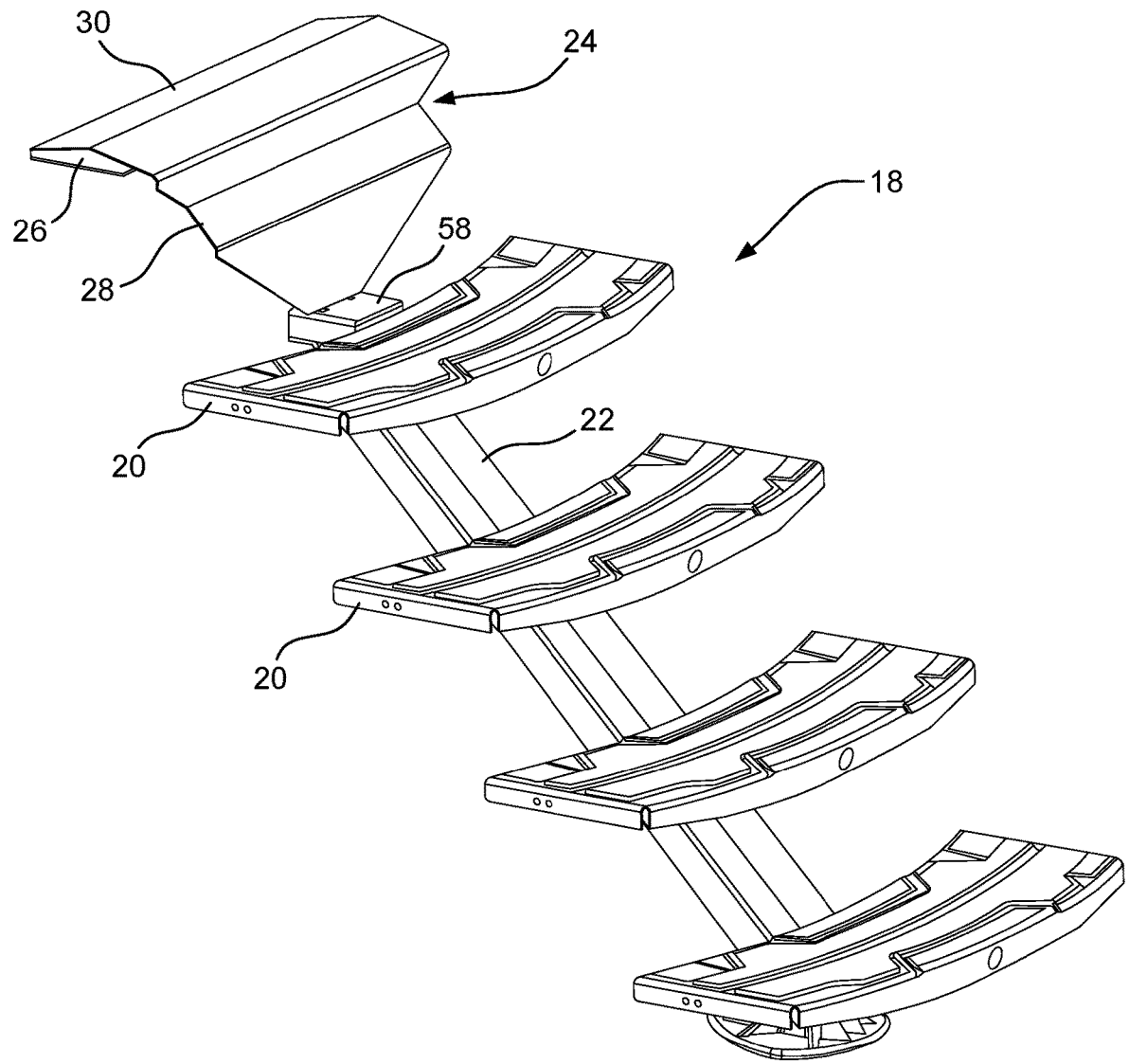
FIG. 2 is a perspective view of the stair assembly.

With reference to FIG. 2, the stair assembly 18 includes a plurality of step treads 20 and a stringer 22 to which the step treads 20 are secured. In the exemplary construction shown in FIG. 2, the stringer 22 is centrally positioned relative to a width of the treads. In some embodiments, the stringer 22 is a single stringer and is the sole support for the step treads 20. Generally, it is desirable that the stringer 22 be positioned within the tread width. In this context, the stair assembly 18 may include multiple stringers positioned within the tread width. The location of the one or more stringers within the tread width reduces a trip hazard for the user and allows for the possibility of a user to ascend the stairs from either side as opposed to limited entry from the front of the stairs.

Figure 8:
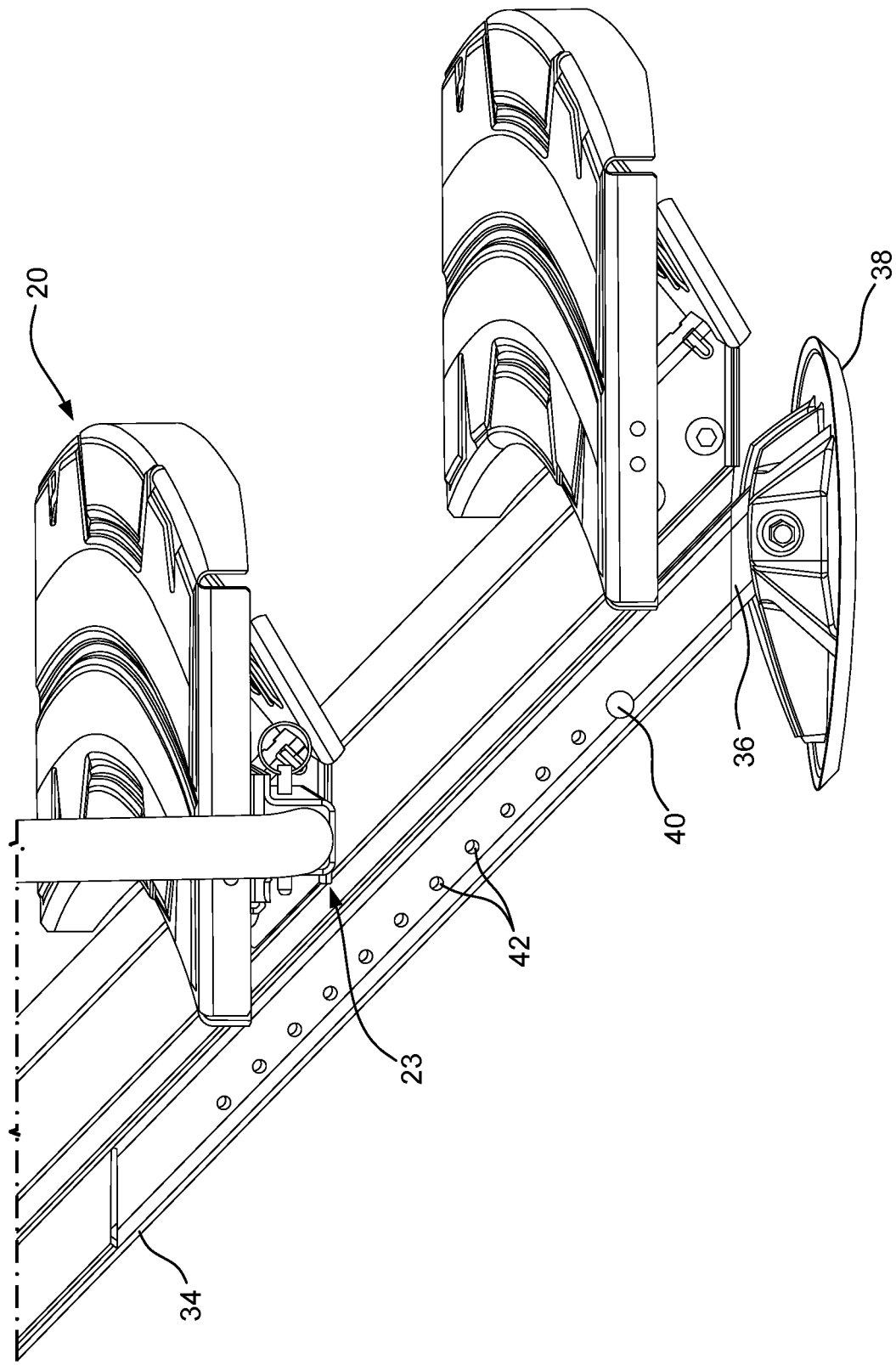
FIGS. 8-10 show a lower end of the stair assembly with a support leg and footpad.

The step treads 20 are generally constructed of a flat top with bent edges to create a downward flange on the front, back, and sides of each tread. With reference to FIG. 2, the step treads 20 also have a slight upward curve when viewed from a top perspective. That is, the step treads 20 generally curve around the stringer 22. The step treads may also include embossing on the top surface or other surfaces to increase strength and durability. A hand rail mount 23 may be integrated with one or more of the step treads 20 as shown in FIG. 8.

The stair assembly 18 also includes a threshold plate 24 secured to the stringer 22 and selectively attachable to the entry threshold 14. As discussed in more detail below, the threshold plate 24 may include a connecting section 26 attachable to the entry threshold 14 and a support plate 28 connected to the stringer 22. The connecting section 26 is coupled to the support plate 28 via a hinge 30. The hinge 30 enables the stair assembly 18 to be pivotable from the use position shown in FIGS. 1 and 2 to the stowed position generally within the door frame 12 for transport.

Figure 3:
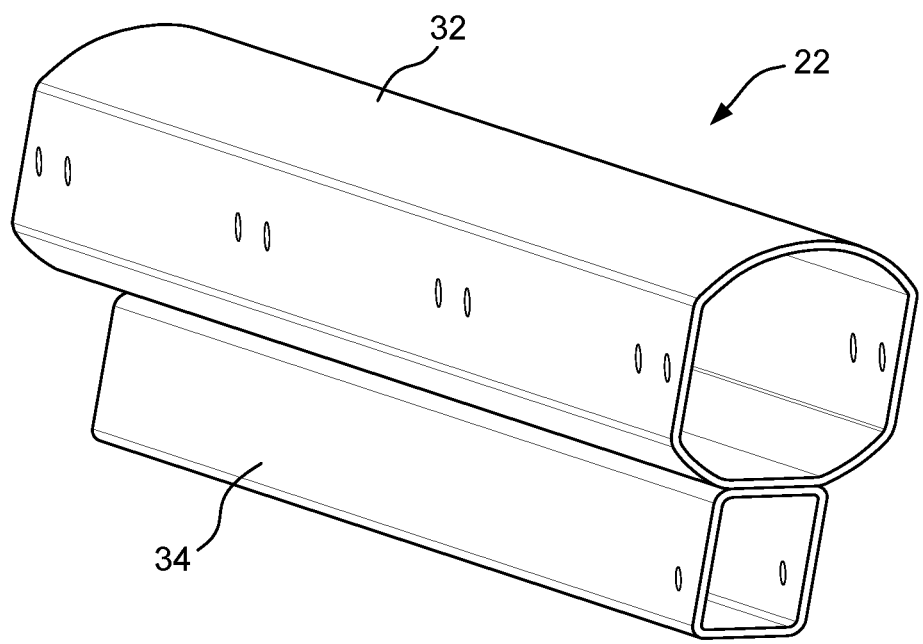
FIGS. 3 and 4 show variations of the stringer.
Figure 4:
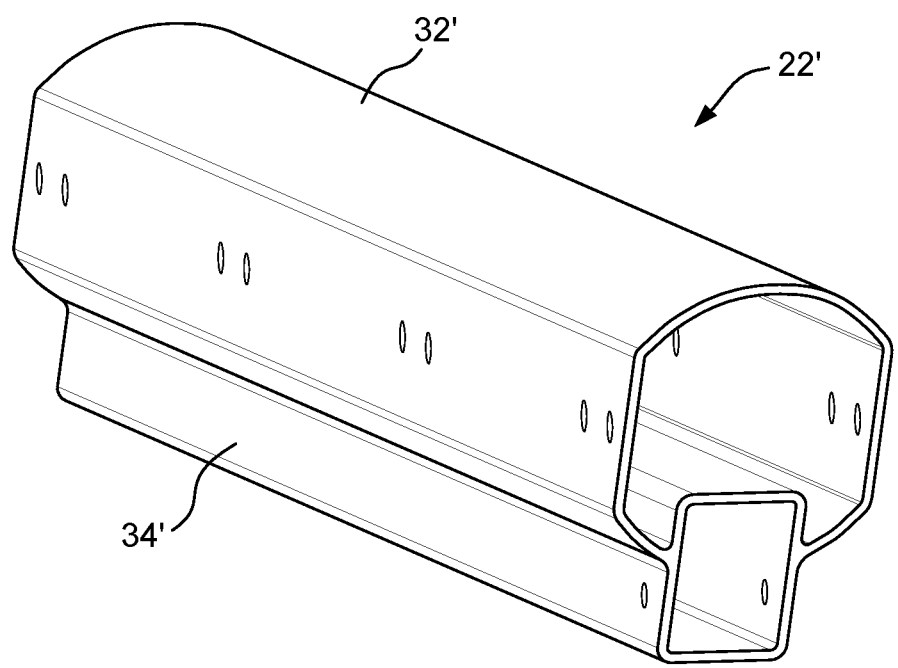

FIG. 3 shows an exemplary cross-section of the stringer 22. In FIG. 3, the stringer 22 includes a bracket connect section 32 and a leg section 34. In some embodiments, the bracket connect section 32 and the leg section 34 are separately constructed of an aluminum extrusion, where the separate parts are subsequently welded together to define the stringer 22. In an alternative construction shown in FIG. 4, the stringer 22' includes the bracket connect section 32' and the leg section 34' integrated as a one-piece extrusion.

The bracket connect section 32, 32' has a particular shape, for example a rounded shape as shown, to mount individual step treads 20 via respective tread mounting brackets (described in detail below). Additionally, the stringer 22, 22' may be provided with wire tracks for containing wiring for additional features such as lighting of the steps.

Figure 10:
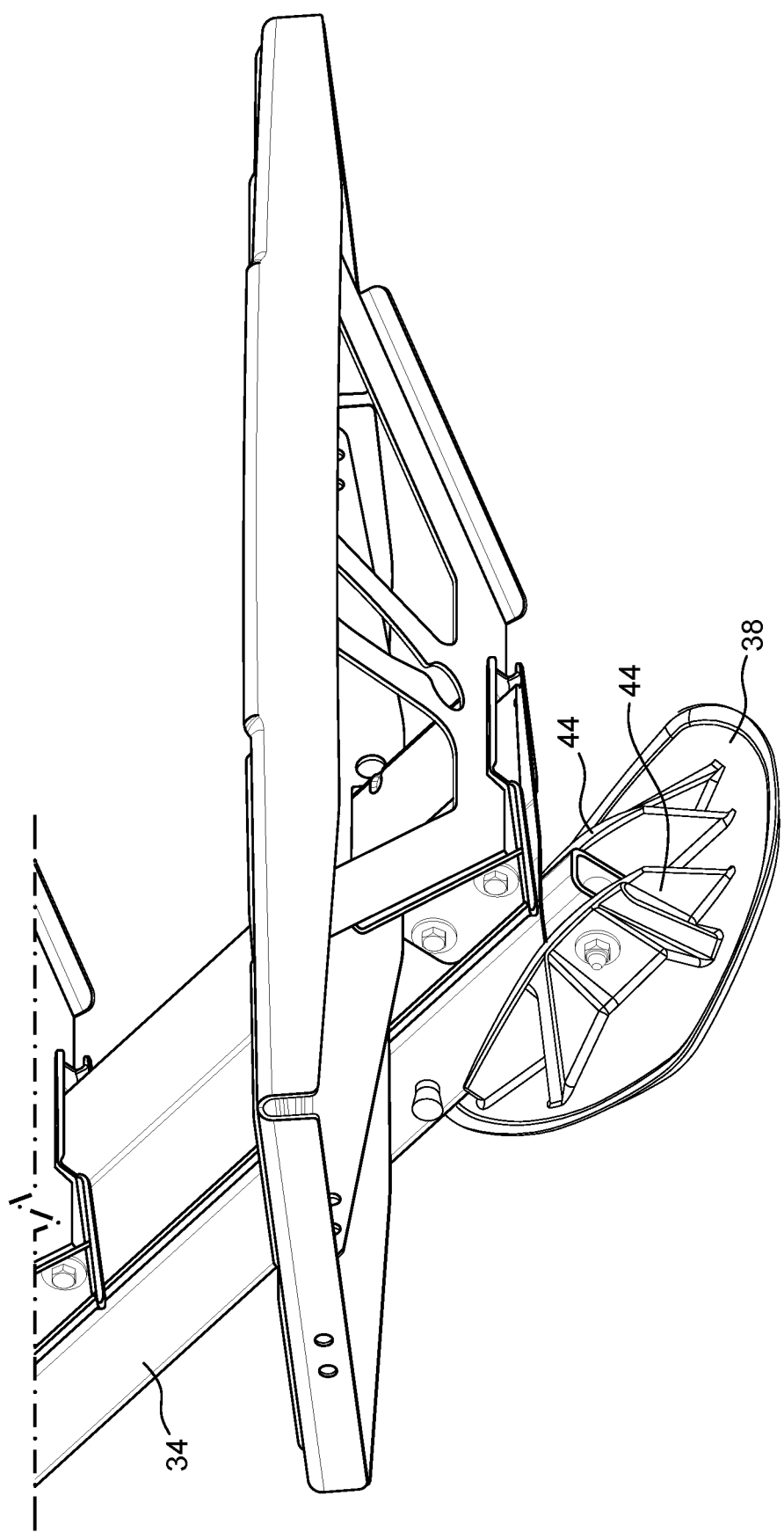

The leg section 34, 34' houses a telescoping support leg 36 (FIG. 8) to which a footpad 38 is attached. The telescoping leg 36 can be extended, retracted or potentially removed from the stair assembly 18. The telescoping leg 36 can be extended or retracted and locked via a pin 40 and corresponding apertures 42 through the leg section 34 and the support leg 36. This construction enables the footpad 38 to be extended or retracted to accommodate for variations in ground level. As shown in FIG. 10, the footpad 38 also includes ears 44 for securing the footpad 38 to the support leg 36. The ears 44 are spaced by an amount that generally corresponds to a width of the leg section 34 so that the footpad 38 can assume the non-use position shown in FIG. 10.

The step treads 20 individually mount to the stringer 22 via a tread mounting bracket 46 with flanges 48 that are shaped in complement with the outer shape of the bracket connect section 32. This fitting relationship provides a clamping surface for the tread mounting bracket 46 to reduce torsional deflection when the stair assembly 18 is in use. As shown in FIGS. 3, 4, 5A and 5B, there are mounting holes in both the flanges 48 and in the bracket connect section 32 of the stringer 22 to receive bolts and secure the step treads 20 in place.

Figure 5B:
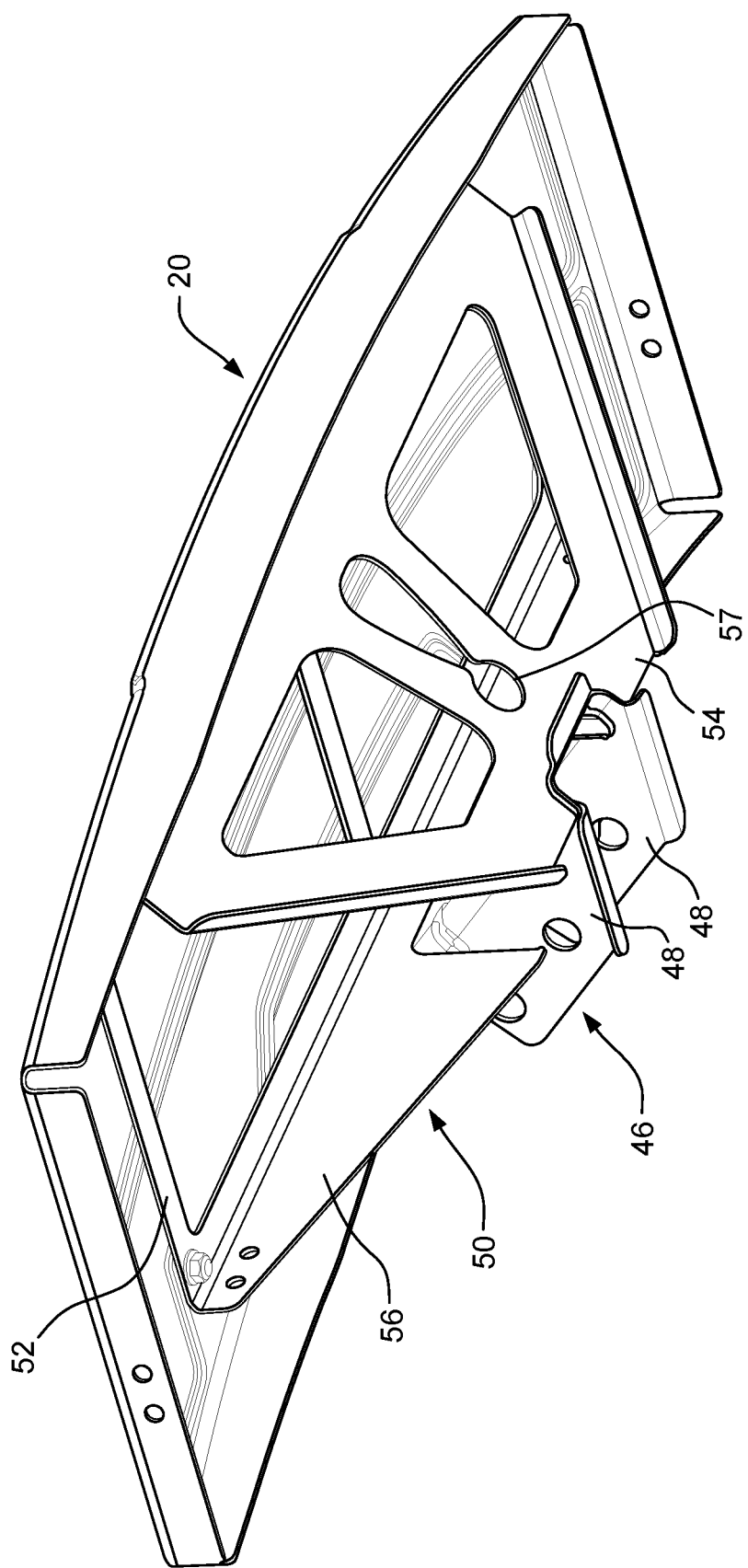
Figure 6:
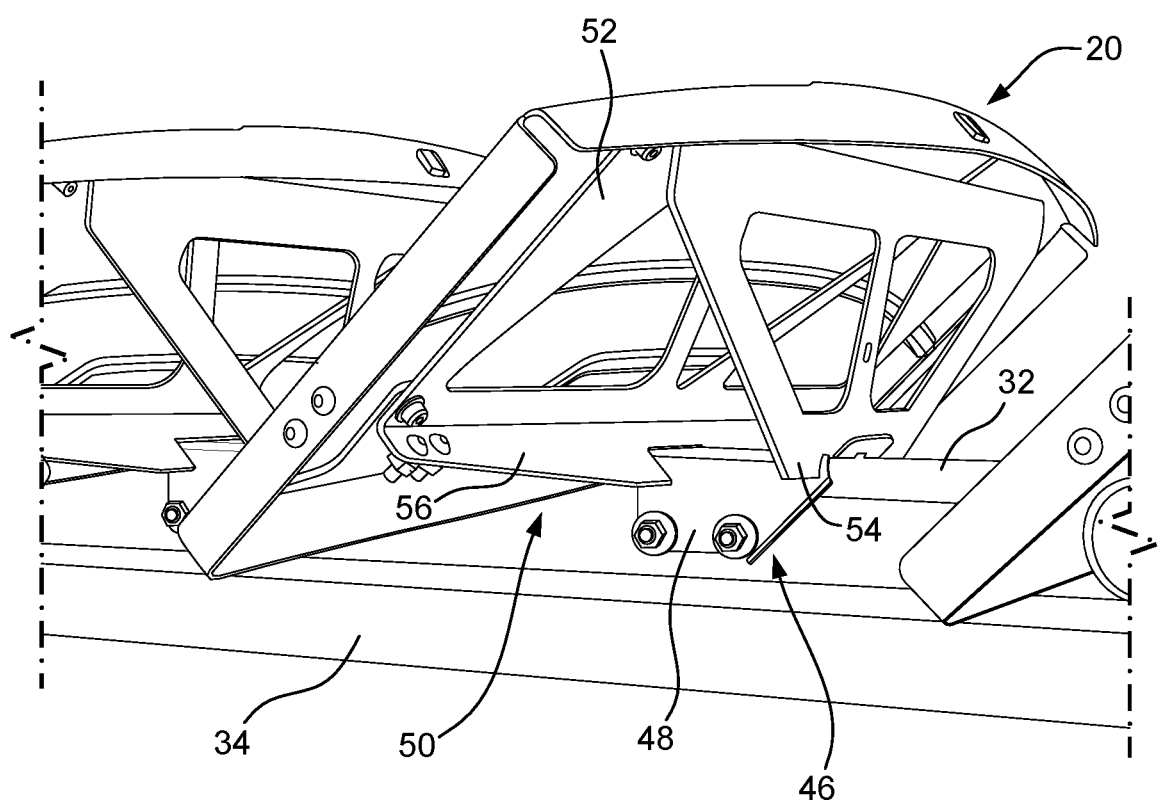
Figure 9:
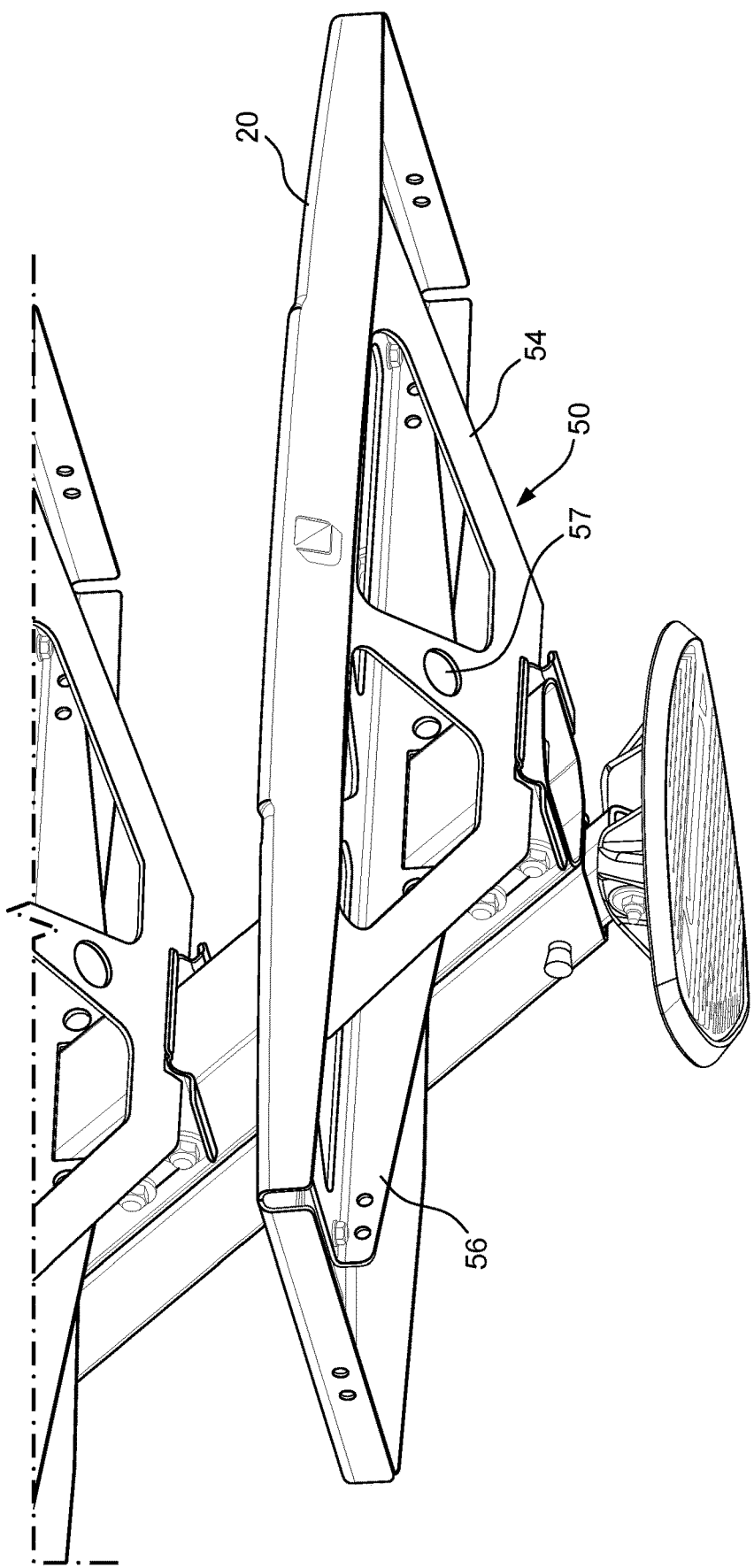

With continued reference to FIGS. 5A, 5B, and 6, each step tread 20 includes a support structure 50 connecting the step tread 20 to the tread mounting bracket 46. The support structure 50 includes an angular frame from a side profile that supports the bottom surface of the step tread 20, supports the front edge of the step tread 20, and supports the rear edge of the step tread 20. The front and rear supports of the support structure 50 are secured to the mounting bracket 46. The angular frame of the support structure 50 includes a first leg 52 or web that extends across a bottom surface of the step tread 20. A second leg 54 is in the form of a triangular plate that extends from a front of the step tread 20 toward the stringer 22. A third leg 56 extends from the rear of the step tread 20 toward the stringer 22. The third leg 56 may also be triangular in shape. The second and third legs 54, 56 are fixed to the mounting bracket 46. In other embodiments, one of the second or third legs 54, 56 may be directly connected to the other of the second or third legs. A lighting feature may be mounted in a small hole 57 in the angled leg 54 of the support structure 50 underneath the step tread 20 as shown in FIG. 9.

Figure 5C:
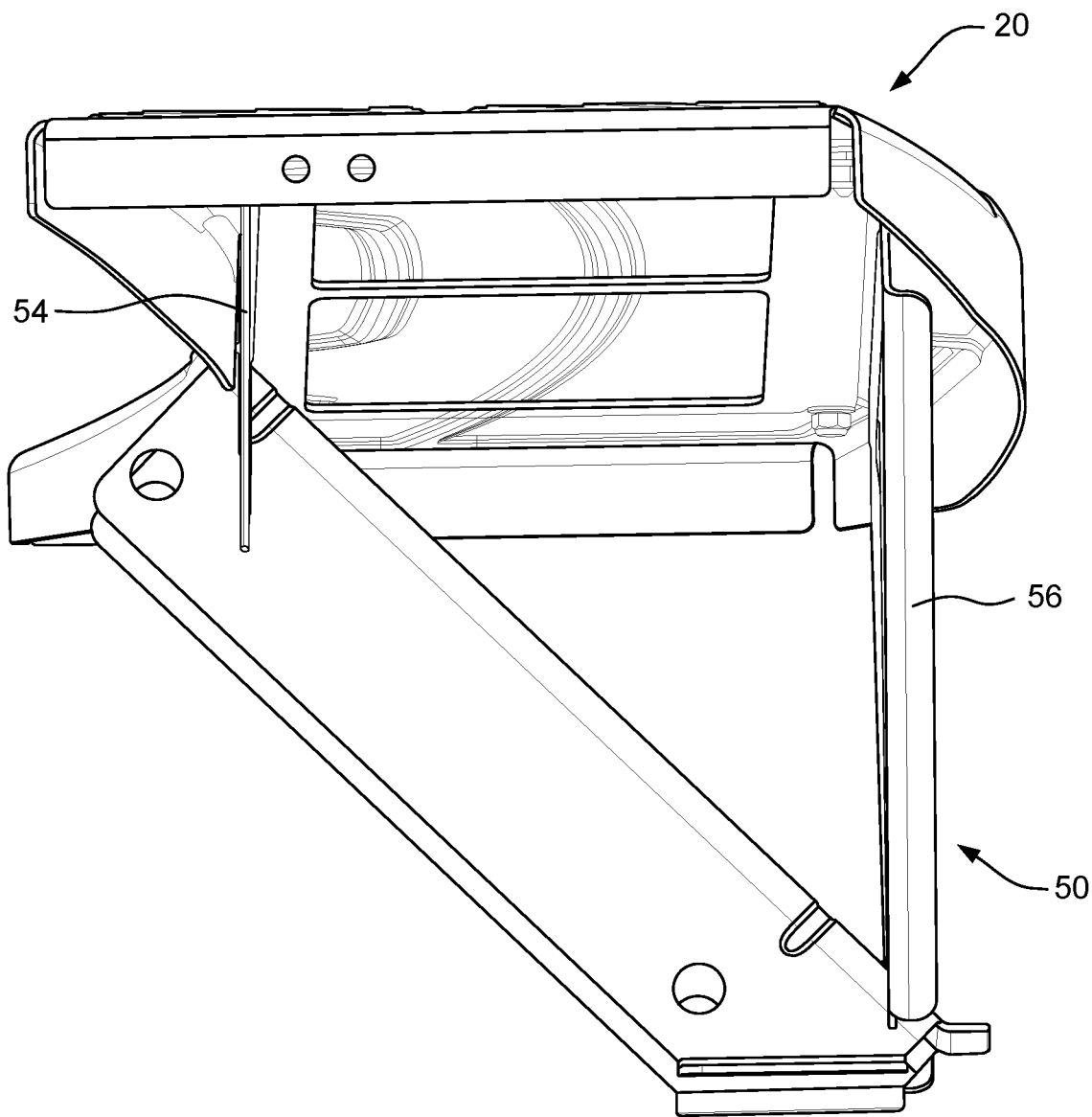
Figure 5D:
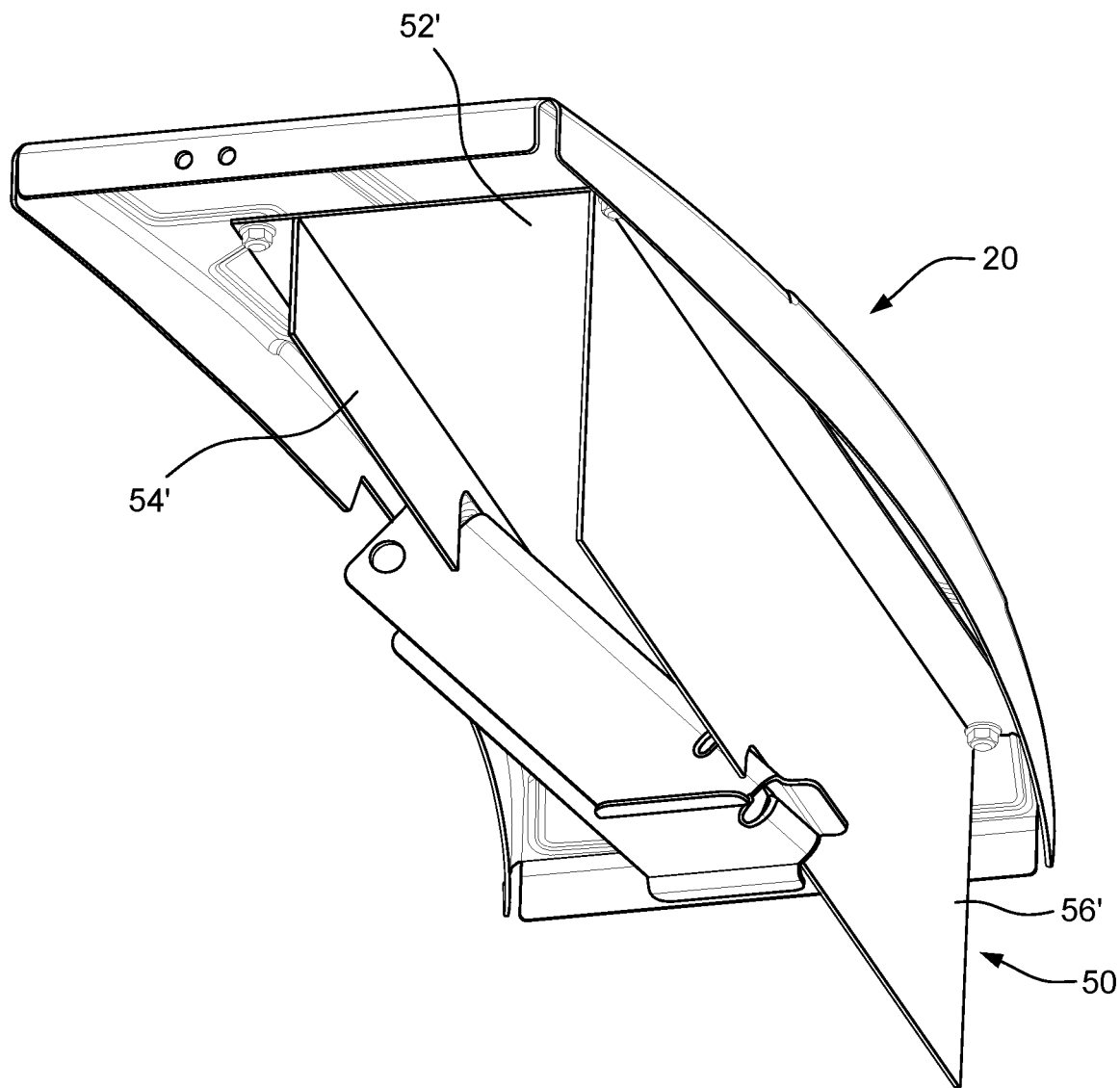

FIG. 5B shows another example of the support structure 50 with larger triangular front and rear supports for increased stability, strength, and load support of the step tread 20. This embodiment also shows an alternative lighting feature mounting hole 57. FIGS. 5C and 5D show alternative examples of the support structure 50 having second and third legs 54, 56 with 90° bends relative to the first leg or web. FIG. 5D shows an embodiment having solid sheet plates instead of formed triangular plates for first 52', second 54', and third 56' legs. Other suitable plate angles and shapes may be used in the support structure.

Figure 7A:
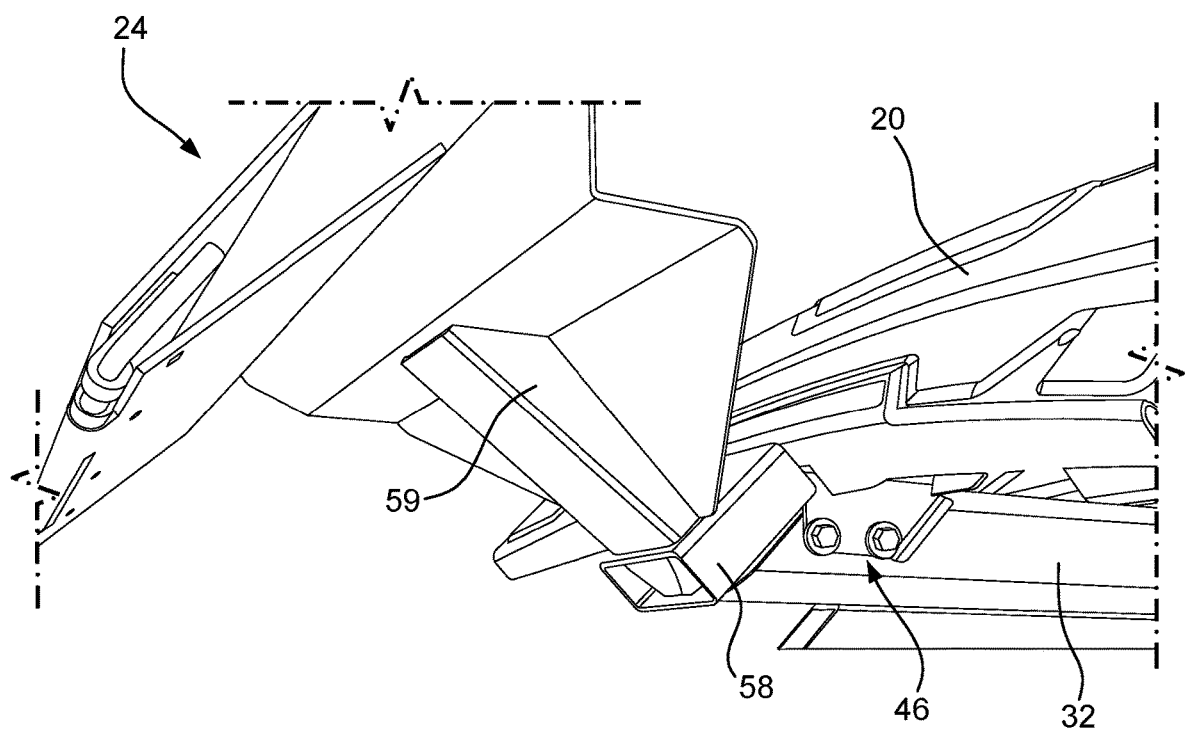
FIGS. 7A-7B show the connection between the stringer and the threshold plate.
Figure 7B:
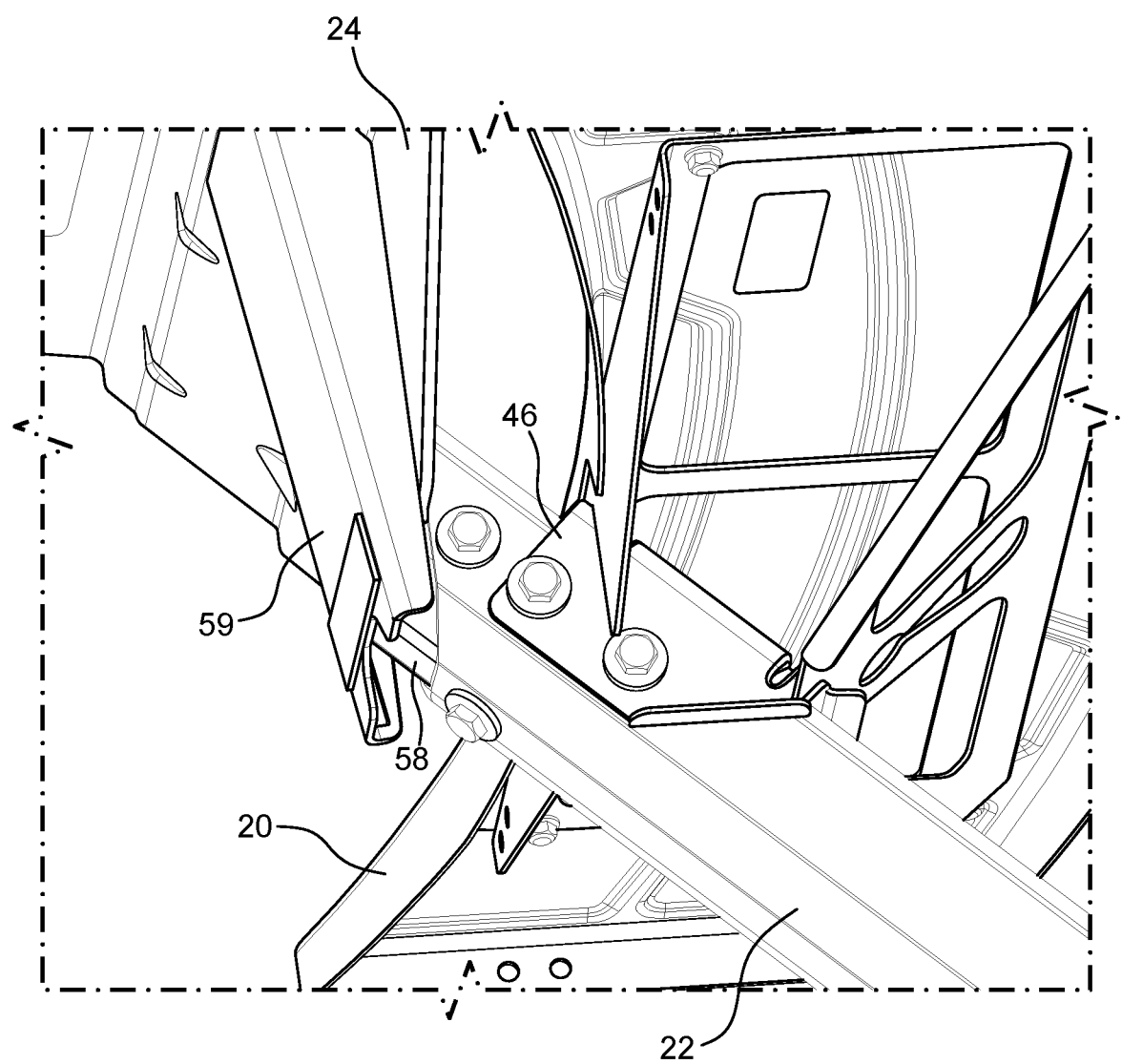

With reference to FIGS. 2, 7A, and 7B, a top of the stringer 22 may be shaped to receive an adapter 58 that extends into the bracket connect section 32 of the stringer and is connected to the threshold plate 24. FIG. 7B shows an alternative adapter 58 and threshold plate 24 connection where the adapter 58 is more directly welded to the threshold plate. In this view, the stringer 22 is translucent to better demonstrate the connection of the adapter 58 to the stringer 22 and step tread mounting bracket 46. In this embodiment, the adapter 58 is shaped to correspond to both the bracket connect section 32 and leg section 34 of the stringer 22. The adapter 58 includes two apertures per side corresponding to apertures in the stringer 22 and step tread mounting bracket 46 for receiving singular fasteners. The adapter 58 also includes one aperture per side as well as an aperture in the bottom of the adapter corresponding to apertures in the stringer 22 for fasteners to further strengthen and secure the threshold plate 24.

In some embodiments, the adapter 58 is welded to two other support components that create a 90° angle that is welded to and supports the support plate 28 of the threshold plate 24 that is made to protect the vehicle wall. A vertical support component 59 extends up with the back of the threshold plate 24 for extra support. The top step tread mounting bracket 46 shown in FIGS. 7A and 7B, the stringer 22, and the threshold plate adapter 58 each contain mounting holes for receiving the same bolts to clamp all three components together and to secure the step tread 20 and the threshold plate 24 in place with the stair assembly 18.

The pivotable stair assembly 18 may be provided with a lift assist mechanism or the like to facilitate displacement of the stair assembly from the use position to the stowed position. For example, the stair assembly may include a gas strut or the like that is biased to pivot the stair assembly toward the stowed position. As such, the gas strut can allow the stair assembly to be pivoted to the use position in a controlled manner and similarly can assist the user in pivoting the stair assembly back to the stowed position.

Figure 11:
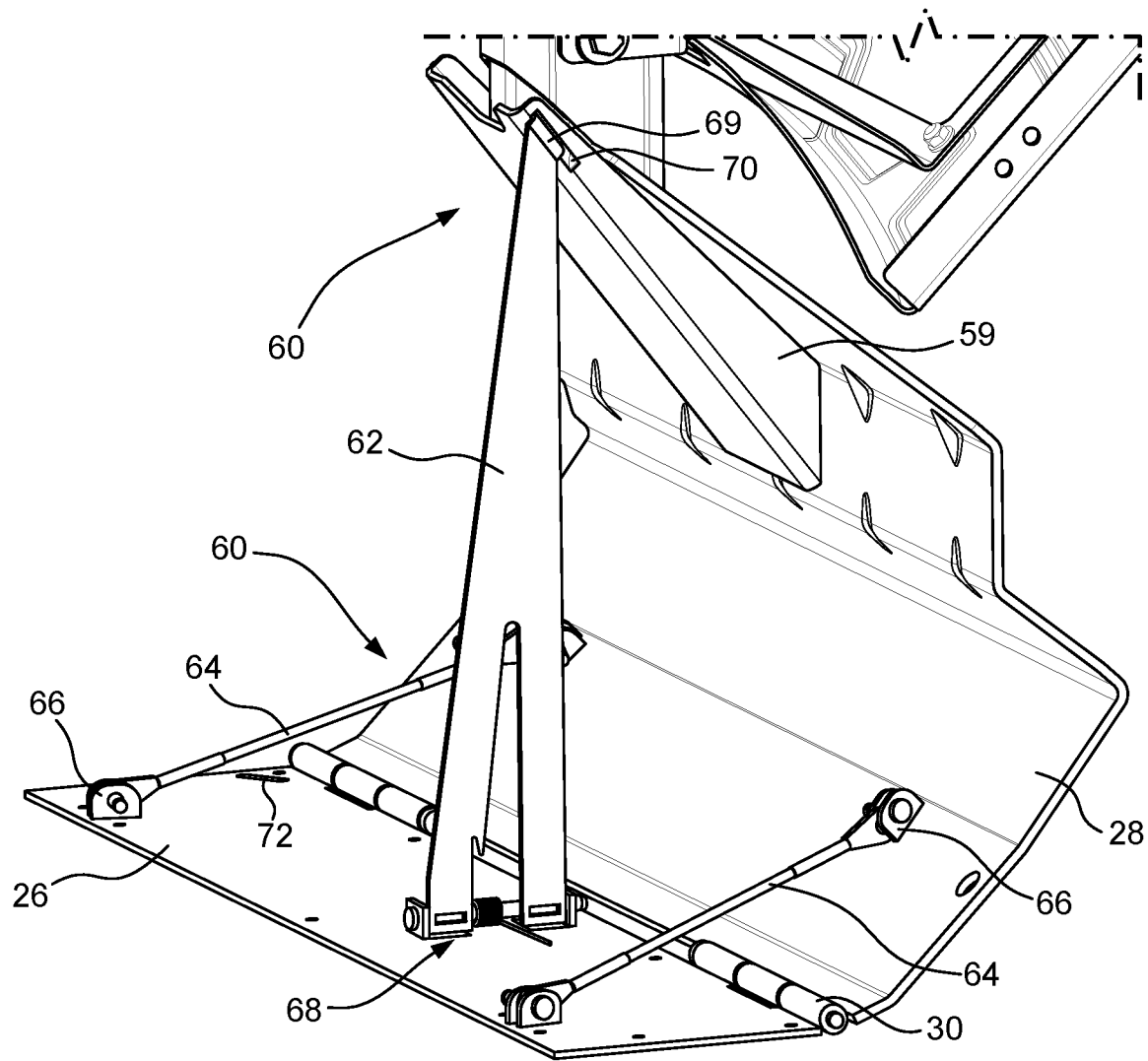
FIG. 11 shows the stair assembly in a stowed position and secured by a latching assembly.
Figure 12:
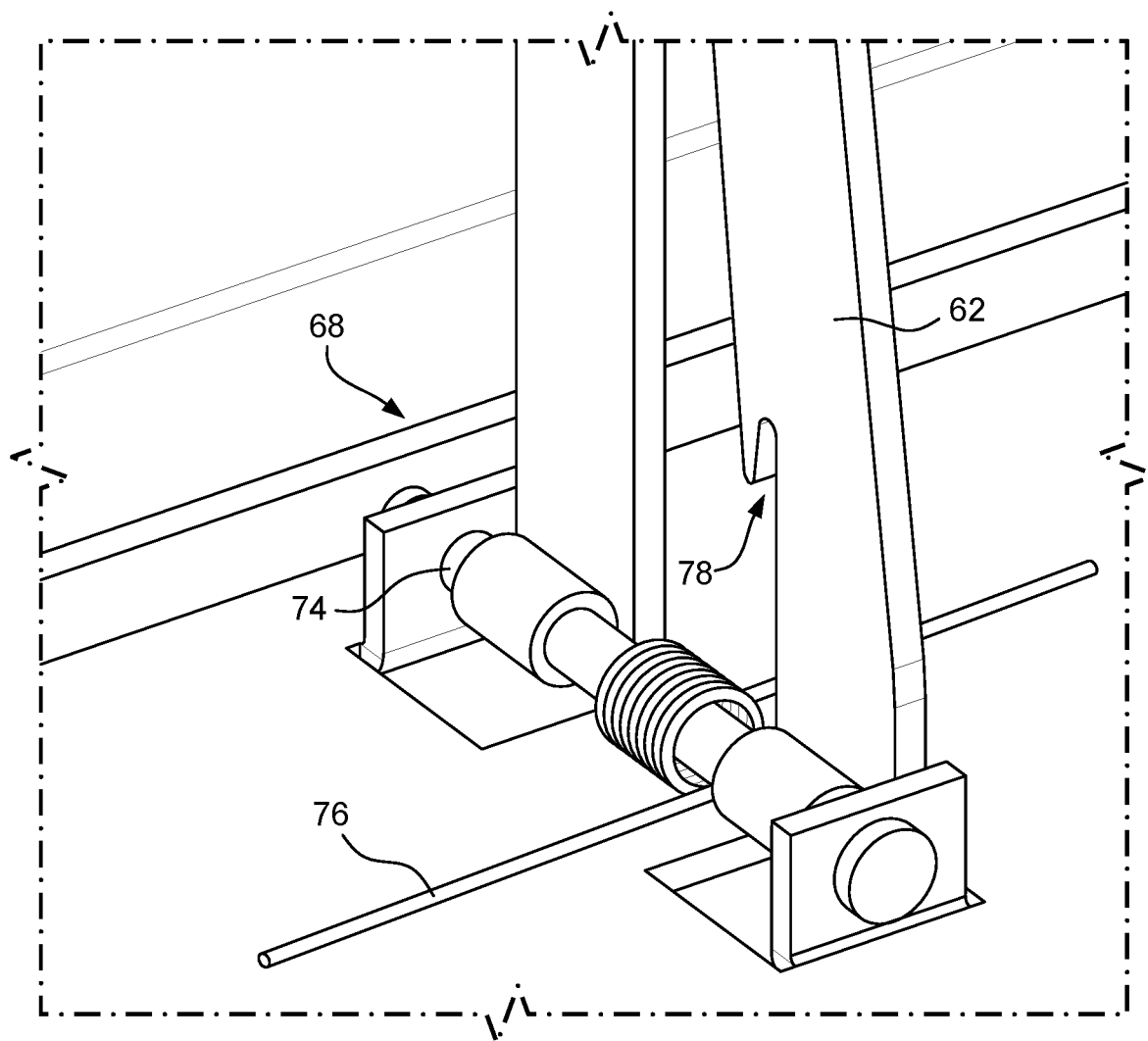
FIG. 12 is a close-up view of the latching assembly propping plate.
Figure 13:
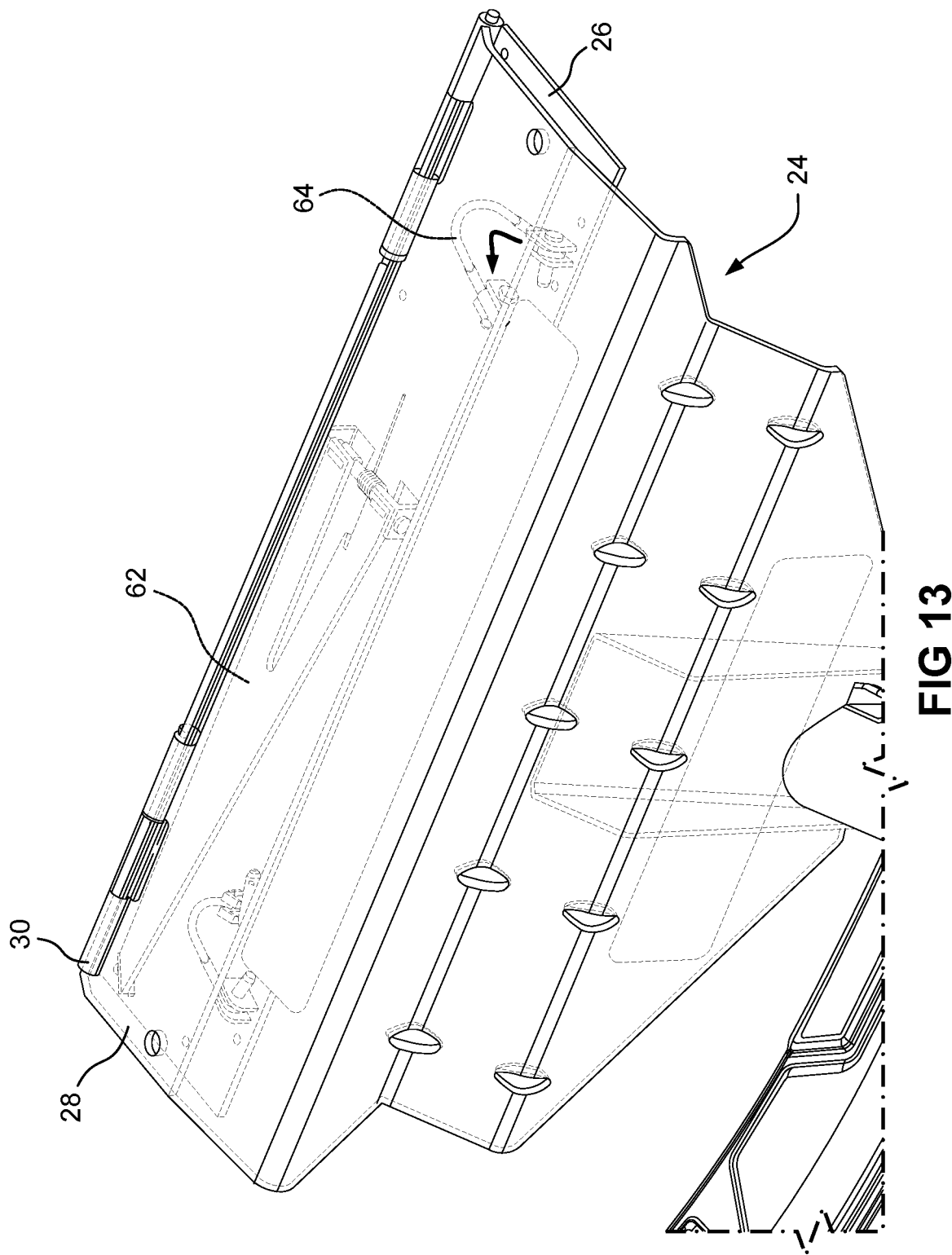
FIG. 13 shows the latching assembly in a disconnected position with the stair assembly in the use position.

With reference to FIGS. 11-13, the stair assembly may also be provided with a latching system 60 for propping the stair assembly in the stowed position (i.e., when not in use) so that the stair assembly remains in a locked position and is prevented from falling over inside or outside of the vehicle or from causing damage to the entry door. FIG. 11 shows the stair assembly in the stowed position. The latching system 60 includes a propping plate or kickstand 62 and one or two connecting cables 64. The cables 64 are connected to respective cable mounts 66 between the connecting section 26 and the support plate 28. The cables 64 provide a tether for supporting the stair assembly in the stowed position and for preventing the stair assembly from falling backwards into the vehicle.

The propping plate 62 is connected at one end to the connecting section 26 of the threshold plate 24 via a spring biased hinge 68 and includes a hook or clip 69 at a distal end of the propping plate 62 that is selectively connected to a slot 70 in the vertical support component 59. In the latched position shown in FIG. 11, the propping plate 62 supports and holds the stair assembly in the stowed position.

To deploy the stair assembly, the hook 69 on the propping plate 62 is released from the retaining slot 70 on the vertical support component 59, and the propping plate 62 is pivoted to be flat with the threshold plate 24 (see FIG. 13). The connecting section 26 of the threshold plate 24 may be provided with an aperture 72 that receives the hook 69 when the propping plate 62 is pivoted flat.

The spring biased hinge 68 biases the propping plate 62 toward the stowed position. FIG. 12 is a close-up view of the spring biased hinge 68. The spring biased hinge 68 includes a hinge 74 and a torsion spring 76. The spring 76 engages a slot 78 in the propping plate 62. The cables 64 naturally fold as the stair assembly is deployed and will rest between the connecting section 26 and the support plate 28 of the threshold plate 24 when the stair assembly is pivoted to the use position.

Figure 14:
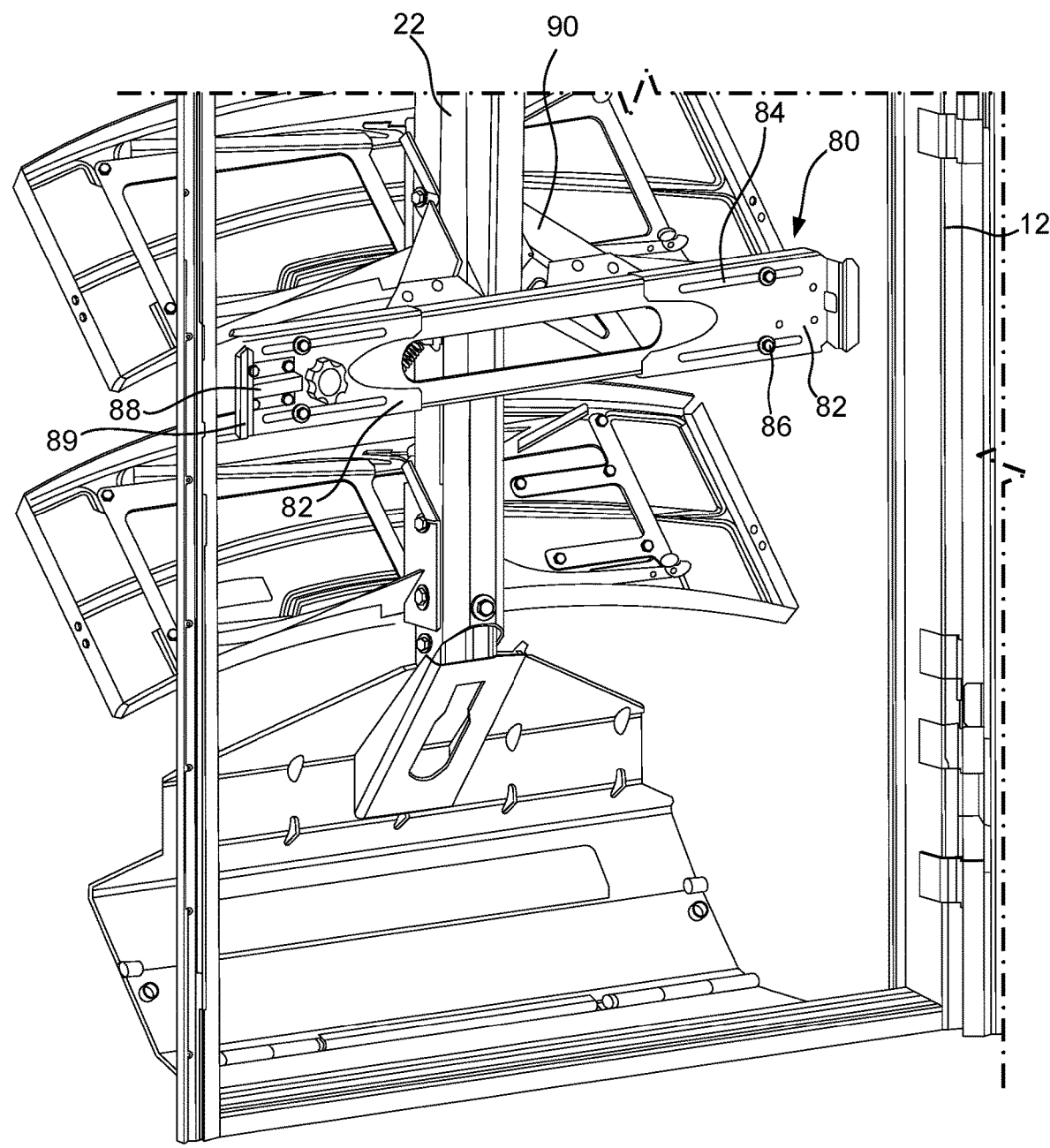
FIGS. 14-15 show the stair assembly including an alternative latching assembly.
Figure 15:
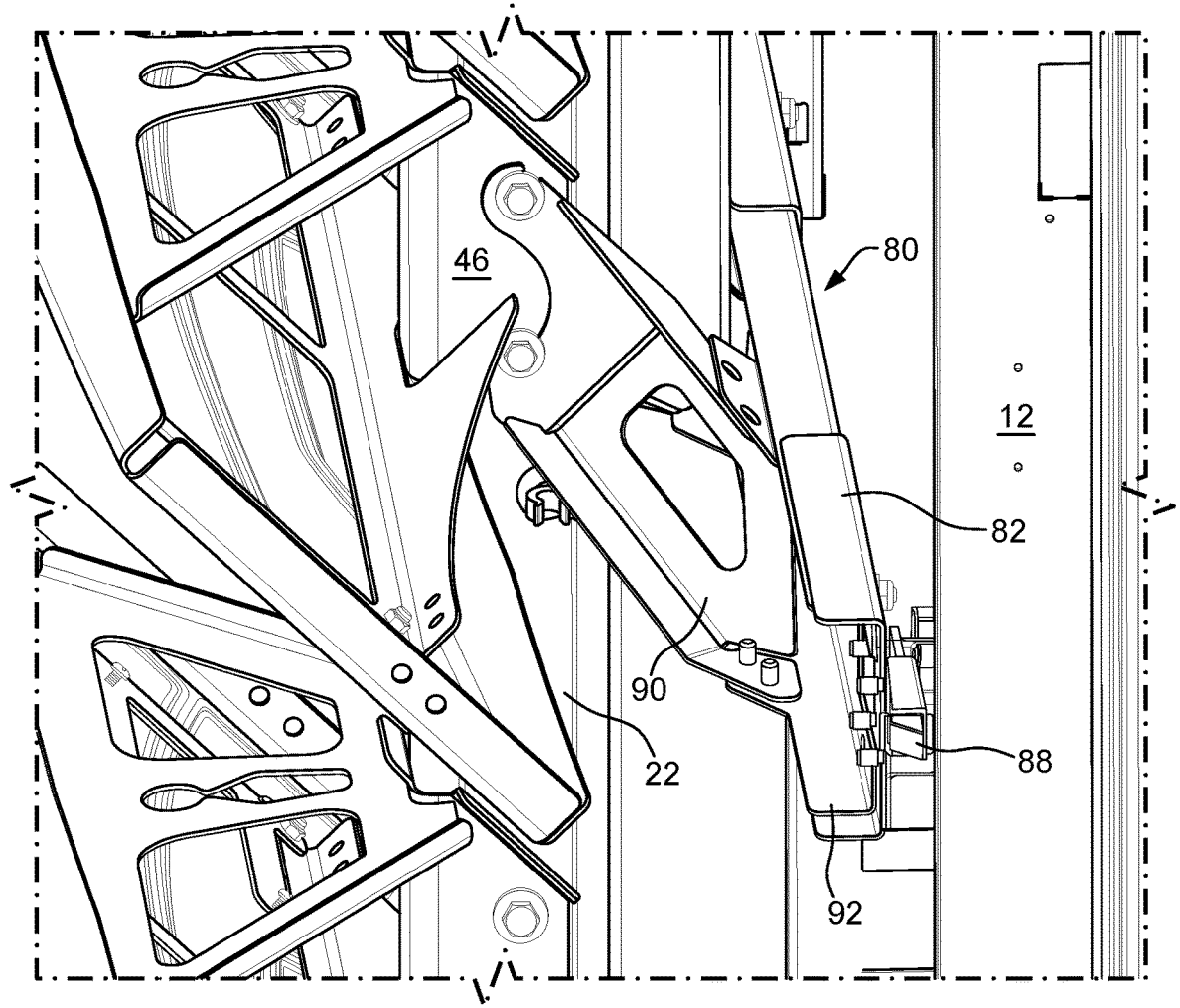

With reference to FIGS. 14-15, the stair assembly may alternatively be provided with a latching system 80 for securing the stair assembly in the stowed position relative to the door frame 12. The latching system 80 generally includes adjustable arms 82 that can be set by the user or original equipment manufacturer (OEM) by bracket slots 84 to accommodate the width of the door frame 12. Once the adjustable arms 82 are extended to the desired position, the arms 82 may be locked in place with fasteners 86 fixing the arms 82 relative to the slots 84. One or both of the adjustable arms 82 includes a spring loaded plunger 88 that engages with a recess or inner face of the door frame 12 when the step assembly is pivoted to the vertical or stowed position, which secures the step assembly within the door frame 12. One or more stop brackets 89 may engage the outer face of the door frame 12 when the step is in the stowed position to pin an outer face or flange of the door frame (not shown) between the plunger 88 and stop bracket 89.

FIG. 15 is a close-up view of an adapter bracket 90 that connects the latching system 80 to the stringer 22 of the step assembly. As shown, adapter bracket 90 may use existing bolts and apertures of a tread mounting bracket 46 for securing a stringer end of the adapter bracket relative to the stringer 22. The latching system 80 may include flanges 92 with apertures that correspond to a latch end of the adapter bracket 90 that may be secured to the latching system 80 with fasteners. The adapter bracket 90 may also be constructed to have a downward slope or angle from the stringer end to the latch end which may lower the height of the latching system 80 to make it more easily accessible or in reach of the user.

The stair assembly of the described embodiments incorporates a centrally positioned stringer resulting in a lighter weight assembly and a sleek appearance. A latch mechanism secures the stair assembly in the stowed position. The stair assembly may also be provided with a lighting feature to enhance its functionality and appearance.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A stair assembly comprising:
   a plurality of step treads, each of the step treads having a tread width;
   a stringer to which the plurality of step treads are secured, wherein the stringer is positioned within the tread width; and
   a threshold plate secured to the stringer and selectively attachable to an entry threshold.

2. A stair assembly according to claim 1, wherein the stringer is centrally positioned within the tread width.

3. A stair assembly according to claim 1, wherein the stringer is a single stringer and is sole support for the step treads.

4. A stair assembly according to claim 1, wherein the threshold plate comprises a hinge such that the stair assembly is pivotable between a stowed position and a use position.

5. A stair assembly according to claim 4, wherein the threshold plate comprises a connecting section attachable to the entry threshold and a support plate connected to the stringer, the stair assembly further comprising a latching assembly configured to be secured the stair assembly in the stowed position, the latching assembly including a propping plate connected at one end to the connecting section and selectively connectable at an opposite end to a vertical support component coupled with the support plate.

6. A stair assembly according to claim 5, wherein the latching assembly further comprises at least one connecting cable connected between the connecting section and the support plate.

7. A stair assembly according to claim 5, wherein the propping plate is pivotable between a connected position engaging the support plate and a disconnected position disengaged from the support plate, wherein in the disconnected position, the propping plate lays flat against the connecting section.

8. A stair assembly according to claim 7, wherein the propping plate is biased toward the disconnected position by a spring.

9. A stair assembly according to claim 4, further comprising an adapter fixed to the threshold plate and securable to the stringer.

10. A stair assembly according to claim 9, wherein a top step tread of the plurality of step treads is secured to the stringer via bolts, and wherein the adapter is secured to the stringer with the bolts.

11. A stair assembly according to claim 1, further comprising a plurality of tread mounting brackets respectively connected between the step treads and the stringer.

12. A stair assembly according to claim 11, wherein the stringer comprises a bracket connect section and a leg section, the bracket connect section having an outer shape, and wherein the tread mounting brackets comprise flanges that are shaped in complement to the outer shape.

13. A stair assembly according to claim 12, wherein the flanges of the tread mounting brackets are secured to the stringer via bolts.

14. A stair assembly according to claim 11, wherein each of the tread mounting brackets comprises a support structure connected to the tread mounting brackets, the support structure comprising a triangular frame from a side profile with a first leg that extends across a bottom surface of the step treads, a second leg as an angled plate that extends from a front of the step treads and is connected to the tread mounting brackets, and a third leg fixed to the tread mounting brackets.

15. A stair assembly according to claim 1, wherein the step treads comprise a flat top with bent edges to create downward flanges on a front, a back, and sides of each of the step treads.

16. A stair assembly according to claim 1, wherein the step treads are curved around the stringer.

17. A stair assembly according to claim 1, wherein the stringer comprises a bracket connect section and a leg section, the stair assembly further comprising a support leg selectively positionable in the leg section.

18. A stair assembly according to claim 17, further comprising a stabilizing footpad secured at a distal end of the support leg.

19. A stair assembly according to claim 1, wherein the stringer comprises a bracket connect section and a leg section, and wherein the stair assembly further comprises an electrical wire extending through one of the bracket connect section and the leg section.

20. A stair assembly according to claim 1, wherein the stringer comprises a bracket connect section and a leg section, wherein the bracket connect section comprises a first extruded hollow tube and the leg section comprises a second extruded hollow tube, the bracket connect section being fixed to the leg section.

21. A stair assembly comprising:
   a plurality of step treads, each of the step treads having a tread width; and
   a stringer to which the plurality of step treads are secured, wherein the stringer is positioned within the tread width,
   wherein the stringer comprises a bracket connect section and a leg section, wherein the bracket connect section and the leg section are integrated as a one-piece extrusion.

22. A stair assembly for a vehicle entrance, the stair assembly comprising:
   a plurality of step treads, each of the step treads having a tread width;
   a stringer to which the plurality of step treads are secured, wherein the stringer is positioned within the tread width; and
   a threshold plate secured to the stringer and selectively attachable to the vehicle entrance, wherein the threshold plate comprises a hinge such that the stair assembly is pivotable between a stowed position and a use position.

23. A stair assembly according to claim 22, wherein the stringer comprises a bracket connect section and a leg section, wherein the bracket connect section and the leg section are separately extruded and connected or are integrated as a one-piece extrusion.

24. A stair assembly according to claim 22, further comprising a latching assembly configured to secure the stair assembly in the stowed position.

25. A stair assembly according to claim 24, wherein the threshold plate comprises a connecting section attachable to the vehicle entrance and a support plate connected to the stringer, and wherein the latching assembly comprises a propping plate connected at one end to the connecting section and selectively connectable at an opposite end to a vertical support component fixed to the support plate.

26. A stair assembly according to claim 25, wherein the latching assembly further comprises at least one connecting cable connected between the connecting section and the support plate.

* * * * *